(12) United States Patent  
Kim et al.

(10) Patent No.: US 8,189,031 B2  
(45) Date of Patent: May 29, 2012

(54) METHOD AND APPARATUS FOR PROVIDING PANORAMIC VIEW WITH HIGH SPEED IMAGE MATCHING AND MILD MIXED COLOR BLENDING

(75) Inventors: Keun Ho Kim, Seoul (KR); Do Kyoon Kim, Seongnam-si (KR); Seok Yoon Jung, Seoul (KR); Hee Sae Lee, Yongin-si (KR); Anton Konouchine, Moscow (RU); Vladimir Vezhnevets, Moscow (RU)

(73) Assignee: Samsung Electronics Co., Ltd., Suwon-Si (KR)

( * ) Notice: Subject to any disclaimer, the term of this patent is extended or adjusted under 35 U.S.C. 154(b) by 1609 days.

(21) Appl. No.: 11/591,461

(22) Filed: Nov. 2, 2006

(65) Prior Publication Data

US 2007/0159524 A1   Jul. 12, 2007

(30) Foreign Application Priority Data

Jan. 9, 2006 (KR) .................. 10-2006-0002170

(51) Int. Cl.  
*H04N 7/00* (2006.01)
(52) U.S. Cl. ............ 348/36; 348/37; 348/38; 348/39
(58) Field of Classification Search ........... 348/36–39  
See application file for complete search history.

(56) References Cited

U.S. PATENT DOCUMENTS

| | | | | | |
|---|---|---|---|---|---|
| 5,305,204 | A | * | 4/1994 | Ohhashi | 382/131 |
| 5,995,649 | A | * | 11/1999 | Marugame | 382/154 |
| 6,539,126 | B1 | * | 3/2003 | Socolinsky et al. | 382/274 |
| 6,775,411 | B2 | * | 8/2004 | Sloan et al. | 382/224 |
| 6,834,122 | B2 | * | 12/2004 | Yang et al. | 382/227 |
| 7,239,805 | B2 | * | 7/2007 | Uyttendaele et al. | 396/222 |
| 7,362,969 | B2 | * | 4/2008 | Aliaga et al. | 396/429 |
| 7,366,360 | B2 | * | 4/2008 | Takiguchi et al. | 382/284 |
| 7,412,091 | B2 | * | 8/2008 | Hack | 382/154 |
| 7,730,406 | B2 | * | 6/2010 | Chen | 715/723 |
| 7,764,828 | B2 | * | 7/2010 | Sasaki et al. | 382/154 |

(Continued)

FOREIGN PATENT DOCUMENTS

JP        2004-46573        2/2004

(Continued)

OTHER PUBLICATIONS

Office Action, mailed Jul. 21, 2009, in corresponding Japanese Application No. 2006-349176 (4 PP.).

*Primary Examiner* — Alina N. Boutah  
(74) *Attorney, Agent, or Firm* — Staas & Halsey LLP

(57) ABSTRACT

An apparatus and method of providing a panoramic image, the method including: preparing images of a plurality of levels, which are made by scaling each of two source images at several rates; computing a Sum of Square Difference (SSD) between two corresponding images in each of the plurality of levels of the two source images to form an image stitched together; and when stitching the two images, the overlapping area is divided into a plurality of parts and each part is assigned a weight which is linearly applied respectively to the divided part of each source image for blending color. The apparatus includes stitching units to stitch source images together at the plurality of levels and blending units to color blend the source images in the overlapped area.

8 Claims, 19 Drawing Sheets

U.S. PATENT DOCUMENTS

| | | | |
|---|---|---|---|
| 7,801,214 B2* | 9/2010 | Ichihashi et al. | 375/240.04 |
| 2002/0186425 A1* | 12/2002 | Dufaux et al. | 358/497 |
| 2002/0196340 A1* | 12/2002 | Kato et al. | 348/148 |
| 2003/0026588 A1* | 2/2003 | Elder et al. | 386/46 |
| 2003/0075668 A1* | 4/2003 | Nagasawa | 250/201.3 |
| 2003/0099295 A1* | 5/2003 | Averbuch et al. | 375/240.16 |
| 2003/0235327 A1* | 12/2003 | Srinivasa | 382/104 |
| 2004/0061933 A1* | 4/2004 | Hack | 359/443 |
| 2004/0096120 A1* | 5/2004 | Tong et al. | 382/285 |
| 2004/0114218 A1* | 6/2004 | Karlsson et al. | 359/368 |
| 2005/0008229 A1* | 1/2005 | Sloan et al. | 382/224 |
| 2005/0078866 A1* | 4/2005 | Criminisi et al. | 382/154 |
| 2005/0114801 A1* | 5/2005 | Yang et al. | 715/961 |
| 2005/0151759 A1* | 7/2005 | Gonzalez-Banos et al. | 345/647 |
| 2005/0259859 A1* | 11/2005 | Hassler et al. | 382/141 |
| 2006/0034374 A1* | 2/2006 | Park et al. | 375/240.16 |
| 2006/0034529 A1* | 2/2006 | Park et al. | 382/236 |
| 2007/0025594 A1* | 2/2007 | Han et al. | 382/103 |
| 2009/0169052 A1* | 7/2009 | Seki et al. | 382/103 |
| 2011/0128352 A1* | 6/2011 | Higgins et al. | 348/46 |

FOREIGN PATENT DOCUMENTS

| | | |
|---|---|---|
| JP | 2005-175620 | 6/2005 |
| KR | 10-2005-0009694 | 1/2005 |
| KR | 10-2005-0113058 | 12/2005 |
| KR | 10-2005-0120301 | 12/2005 |

* cited by examiner

US 8,189,031 B2

METHOD AND APPARATUS FOR PROVIDING PANORAMIC VIEW WITH HIGH SPEED IMAGE MATCHING AND MILD MIXED COLOR BLENDING

CROSS-REFERENCE TO RELATED APPLICATIONS

This application claims priority from Korean Patent Application No. 2006-2710, filed on Jan. 9, 2006, in the Korean Intellectual Property Office, the disclosure of which is incorporated herein by reference.

BACKGROUND OF THE INVENTION

1. Field of the Invention

Aspects of the present invention relate to a method and apparatus of providing a panoramic view, and more particularly, to a method and apparatus for providing a panoramic view, in which a processing speed of image stitching is improved and an image is smoothly stitched with respect to a color blending to provide the panoramic view. Also, the method and apparatus may be applied to other fields of stitching images and acquiring an expanded image as well as providing the panoramic view.

2. Description of the Related Art

Currently, when providing a location-based service using a popularized navigation system, a portable device, a personal digital assistant (PDA), etc., more realistic image information may be provided based on a real scene with respect to a service providing area.

As an example, as shown in FIG. 1, as a vehicle moves in the direction of A→B→C, image information for showing the way needs to change from surrounding images 111 that were taken with a rotating camera on a tripod 110 at a location X into surrounding images 121 that were taken on a tripod 120 at a location Y.

As described above, to provide the images photographed by the camera at several locations, to a predetermined system of a user receiving a location-based service in a vehicle, images of each location are stitched together at a part of each image containing the same location, as shown in 210 of FIG. 2, to form one panoramic image as shown in 220 of FIG. 2.

In an image stitching technique for providing a panoramic image, images photographed from many places or locations are gathered together and attached on a virtual cylinder to be registered in a system. For example, as shown in 210 of FIG. 2, generally two images that are overlapped with each other by ¼ to ¾ (25 to 75%) of a width and by 0 to ⅛ (0 to 12.5%) of a height are adjusted to detect a location in which a sum of square difference (SSD) of image data is a minimum. Namely, at the location in which a difference between the two image data is a minimum, the two images are stitched as shown in 220 of FIG. 2, thereby completing a panoramic image.

However, in the conventional image stitching technology as described above, a high overhead occurs due to a large amount of SSD computations. Namely, as described above, since, with respect to the two source images, a data amount of ¼ to ¾ of a width (or a horizontal area) and a data value of 0 to ⅛ of a height (or a vertical area) have to be mutually compared, there is a great load on a processing apparatus such as computation time, memory, bandwidth, or other resources.

Also, in the image stitching described above, although there may be the same images in the parts of the two overlapping images, a great difference may exist in color information due to a difference between environments from which photographs are acquired. In this case, the two images are smoothly connected with each other by blending colors in the overlapped part. For example, in FIG. 3, when a first image 310 having a width A to C is connected with a second image 320 having a width B to D, with respect to parts B to C of the two overlapping images, linear weights $W_1$ and $W_2$ are respectively applied to both image data to be processed. However, in the image blending technology described above, there are many cases of providing unnatural panoramic images due to abrupt color change of two images.

SUMMARY OF THE INVENTION

An aspect of the present invention provides a method of providing a panoramic image, which improves a processing speed of an image stitching and color blending as well as smoothly stitching images. The method may be applied to providing the panoramic image as well as an image made by stitching at least two images together.

An aspect of the present invention also provides an apparatus to perform image stitching and color blending.

According to an aspect of the present invention, there is provided a method of providing a panoramic image, the method including: preparing images of a plurality of levels, which are made by scaling each of two source images at several rates; and computing a Sum of Square Difference (SSD) between two corresponding images in each of the plurality of levels of the two source images to form a stitched together image of the two images.

While not required in all aspects, the SSD with respect to a level having a small number of pixels of the plurality of levels may be computed in a larger image search range, and the SSD with respect to a level having a large number of pixels of the plurality of levels may be computed in a smaller image search range, so as to increase matching precision.

According to another aspect of the present invention, there is provided a method of providing a panoramic image, the method including: detecting a blend area of a certain percent from within a certain range of an overlapped part of two source images; and generating a blended image by linearly applying a weight to two corresponding images in the blend area in each of the two source images.

While not required in all aspects, the weight may be linearly applied to the two corresponding images in the blend area for each of a plurality of portions into which the overlapped part of the two source images is divided.

According to another aspect of the present invention, there is provided a method of providing a panoramic image, the method including: generating a blended image of a first relevant area according to a first weight function linearly applied to two corresponding images in a certain percent area from within a certain range of an overlapped part of two source images; generating a blended image of a second relevant area according to a second weight function applied to one of the two corresponding images in one area outside the certain percent area within the certain range of the overlapped part of the two source images; and generating a blended image of a third relevant area according to a third weight function applied to another of the two corresponding images in another area outside the certain percent area within the certain range of the overlapped part of the two source images.

According to another aspect of the present invention, there is provided a stitching apparatus for a panoramic image, the apparatus including: a first stitching unit to compute an SSD between two corresponding images in a level having a smaller number of pixels of images in a plurality of levels which are made by scaling each of the two source images at several rates and detecting a position having a smallest SSD value to match the two source images; and a second stitching unit to compute the SSD between the two corresponding images in a level having a larger number of pixels than in the first stitching unit, so as to again match the two source images matched by the first stitching unit.

According to a further aspect of the present invention, there is provided a blending apparatus for a panoramic image, the apparatus including: a blend area search unit to search a certain percent of an overlapped part within an input range according to the input range of the overlapped part of the two source images, as a blend area; and a weight application unit to generate a blended image by linearly applying a weight to two corresponding images in the blend area.

According to another aspect of the present invention, there is provided a blending apparatus for a panoramic image, the apparatus including: a first blending unit to generate a blended image in a first relevant area according to a first weight function linearly applied to two corresponding images in a certain percent area from within a certain range of an overlapped part of two source images; a second blending unit to generate a blended image of a second relevant area according to a second weight function applied to any one of the two corresponding images in one area outside the certain percent area within the certain range of the overlapped part of the two source images; and a third blending unit to generate a blended image of a third relevant area according to a third weight function applied to another of the two corresponding images in another area outside the certain percent area within the certain range of the overlapped part of the two source images.

Additional aspects and/or advantages of the invention will be set forth in part in the description which follows and, in part, will be obvious from the description, or may be learned by practice of the invention.

BRIEF DESCRIPTION OF THE DRAWINGS

The above and/or other aspects and advantages of the present invention will become apparent and more readily appreciated from the following detailed description, taken in conjunction with the accompanying drawings of which.

DETAILED DESCRIPTION OF THE EMBODIMENTS

Figure 1:
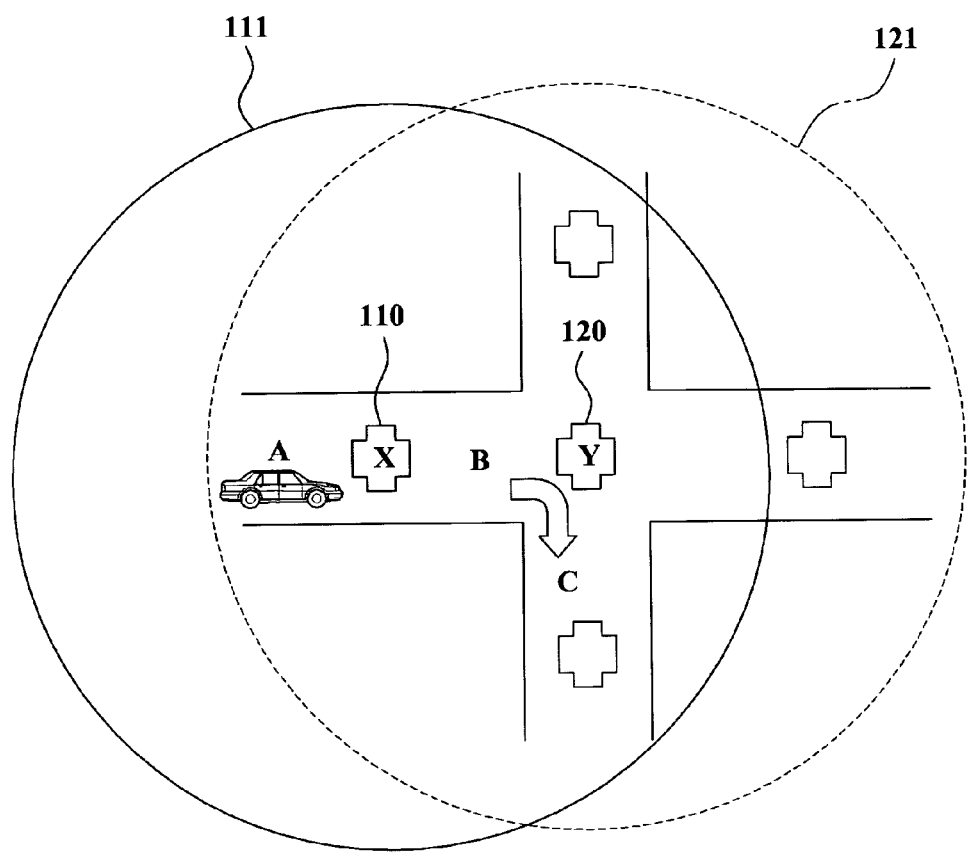
FIG. 1 illustrates a process of acquiring a real scene at a crossroads.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 4:
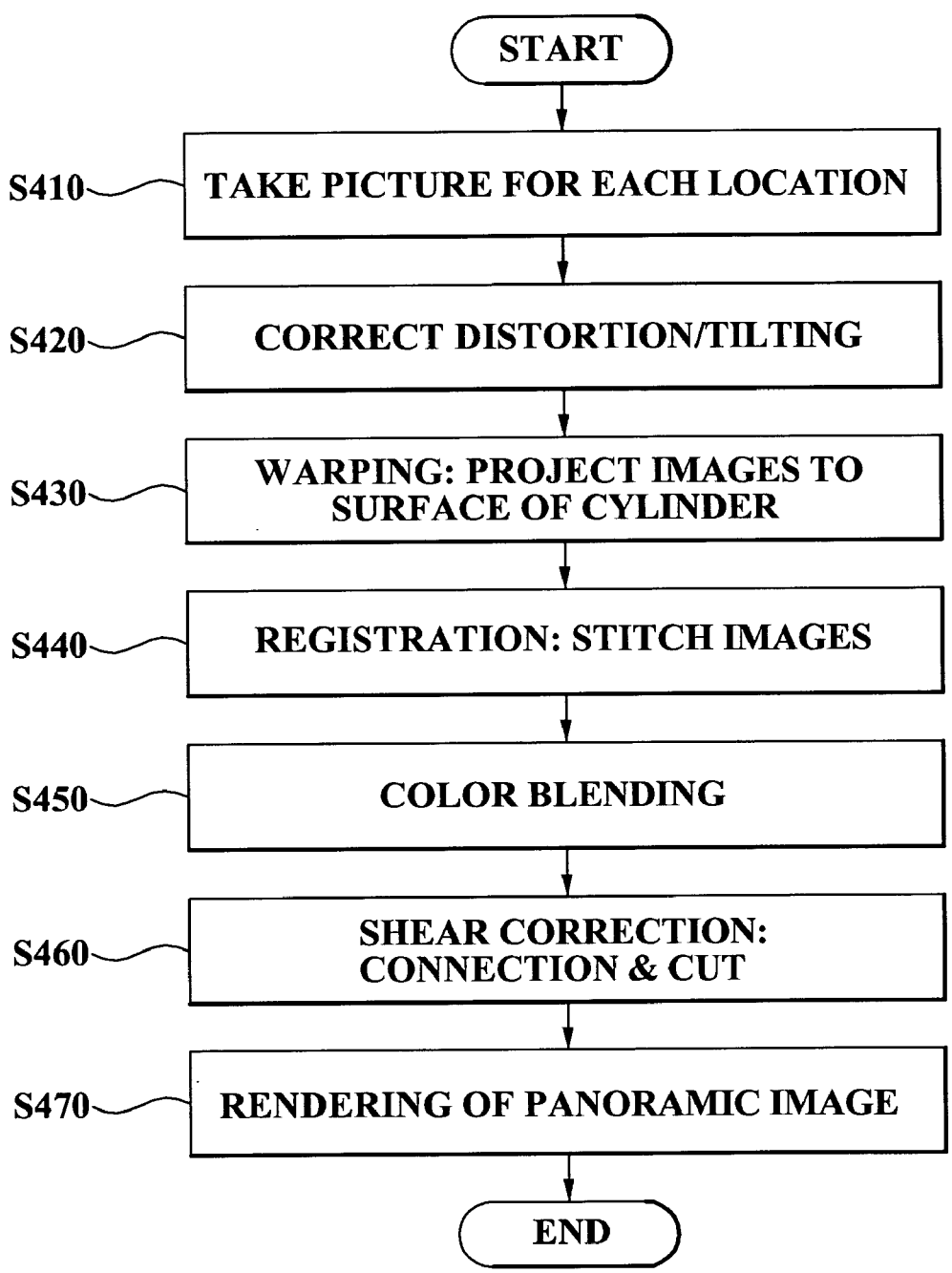
FIG. 4 is a flowchart illustrating a panoramic image providing method according to an embodiment of the present invention.

FIG. 4 is a flowchart illustrating a panoramic image providing method according to an embodiment of the present invention. In operation S410, to provide geometric image information closer to reality when providing a location based service via a navigation system, a mobile communication device, and a PDA, an image based on a real scene with respect to an area providing service is utilized. For example, a surrounding scene may be photographed by a plurality of cameras installed at a crossroad using a tripod, as shown in FIG. 1.

In operation S420, distortion of an image acquired from a camera is corrected. In this case, the image acquired from the camera indicates an image having a resolution of a certain standard such as a video graphics array (VGA) standard, which is a real scene acquired by a digital camera. Also, to use a photograph acquired from an analog camera, the photograph may be converted into a digital image data. Also, in this case, processing an image may indicate processing digital image data of red, green, and blue (R, G, and B) colors in addition to processing digital image data of a grey scale.

Figure 5:
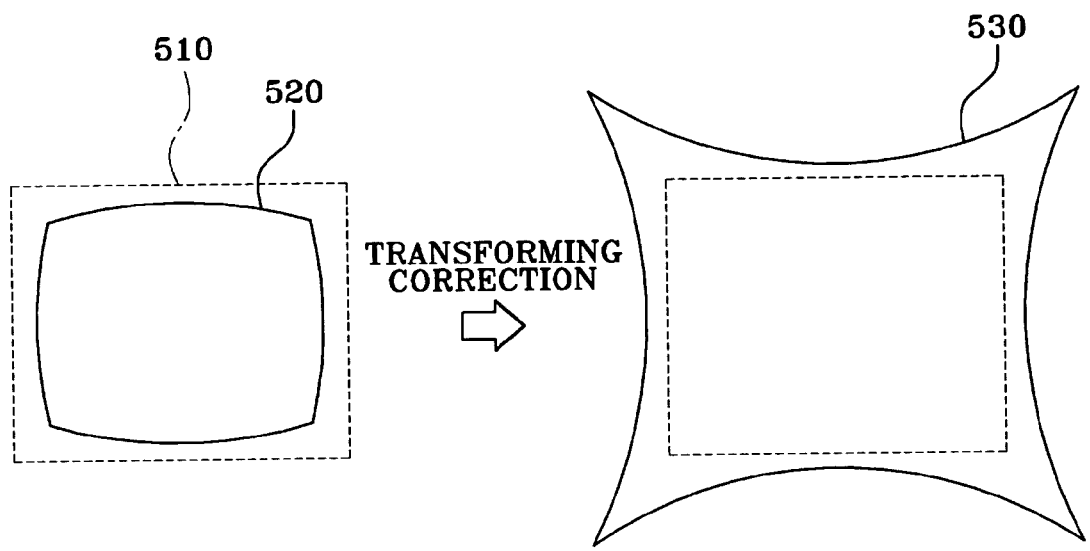
FIG. 5 illustrates a lens distortion correction method.
Figure 6:
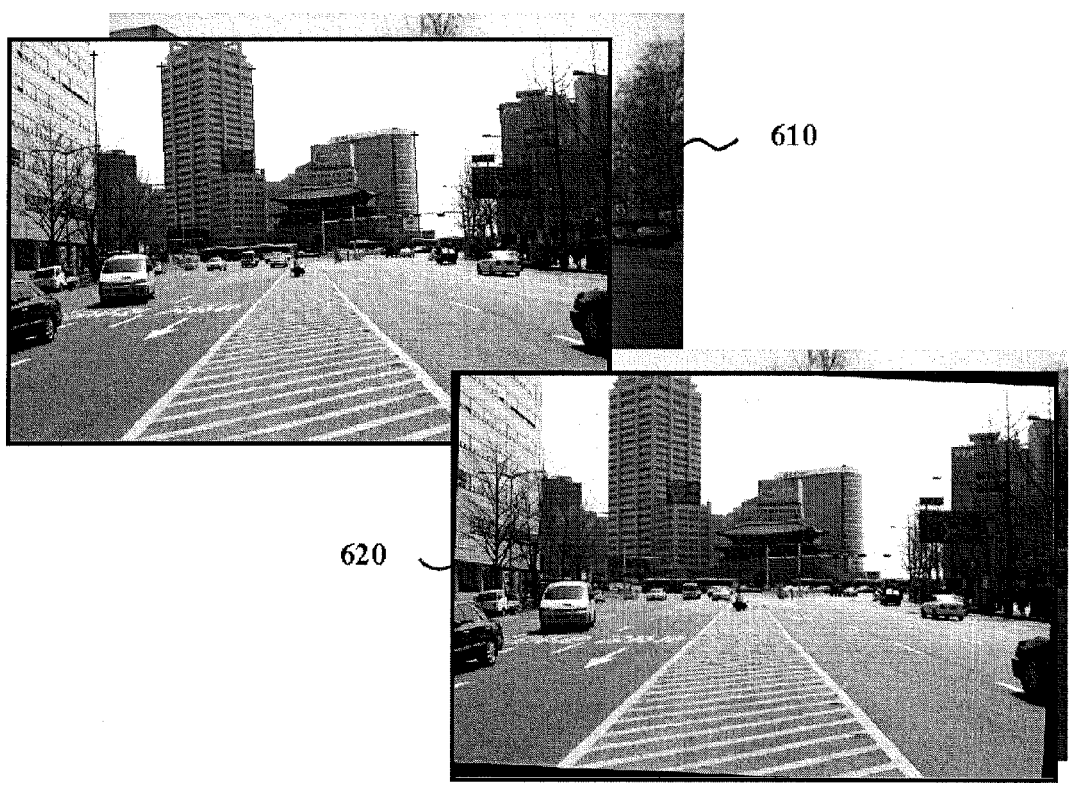
FIG. 6 illustrates photographs before and after a lens distortion correction.

As shown in FIG. 5, an image 520 photographed by a camera is different from a real image 510 as seen through human eyes. Namely, as shown in FIG. 6, a building that is in actuality standing straight up may look crooked and distorted towards the refractive direction of a camera lens. This is because distortion effects by the refraction of a lens are reflected in association with an optical system, when taking a photograph of a real three-dimensional object with a camera. The distorted image 520 may be corrected to have a normal image as shown in the image 510 as seen through human eyes, by transforming the distorted image 520 into a corrected image 530.

To correct an image distortion, there is used a method of using a geometric transformation matrix for a tilting correction. The method is described in detail in another patent application. Hereinafter, the characteristic of the method will be briefly described. For example, an angle that a source image inclines in a plane direction and an angle of bending in a depth direction are assumed to be certain values to estimate the geometric transformation matrix for the tilting correction, and a position of each pixel of the source image may be moved into a tilting corrected position by the geometric transformation matrix for the tilting correction. As described above, according to the method of a geometrically tilting correction by moving each pixel data of the source image to a vector by the tilting correction, as shown in 620 of FIG. 6, buildings in a photograph may be seen exactly as they are without being inclined or slanted.

Figure 7:
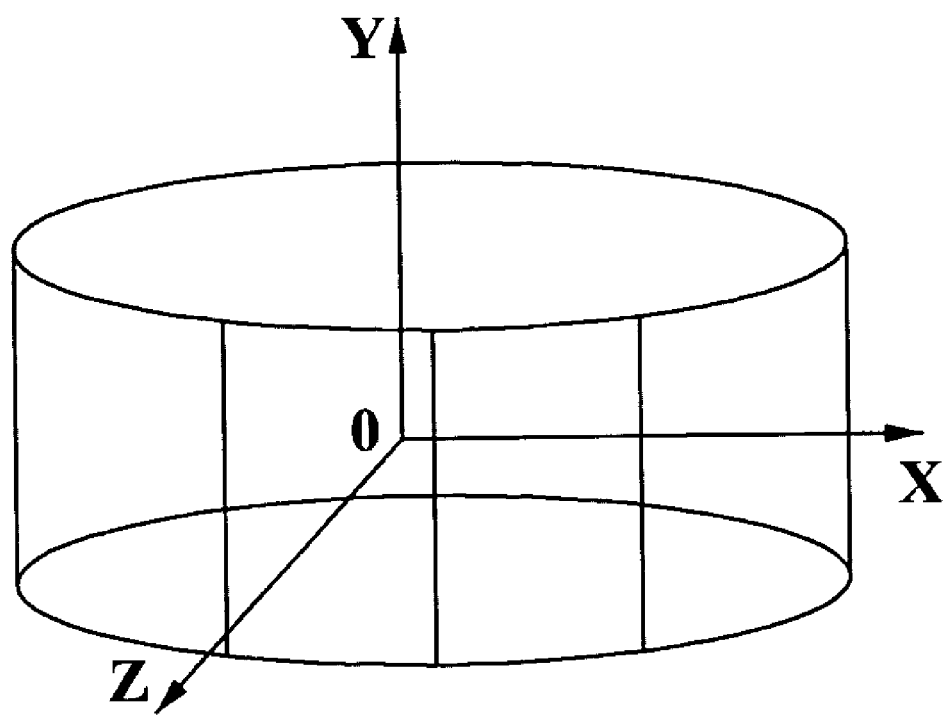
FIG. 7 illustrates an optical center of a panoramic image.
Figure 8:
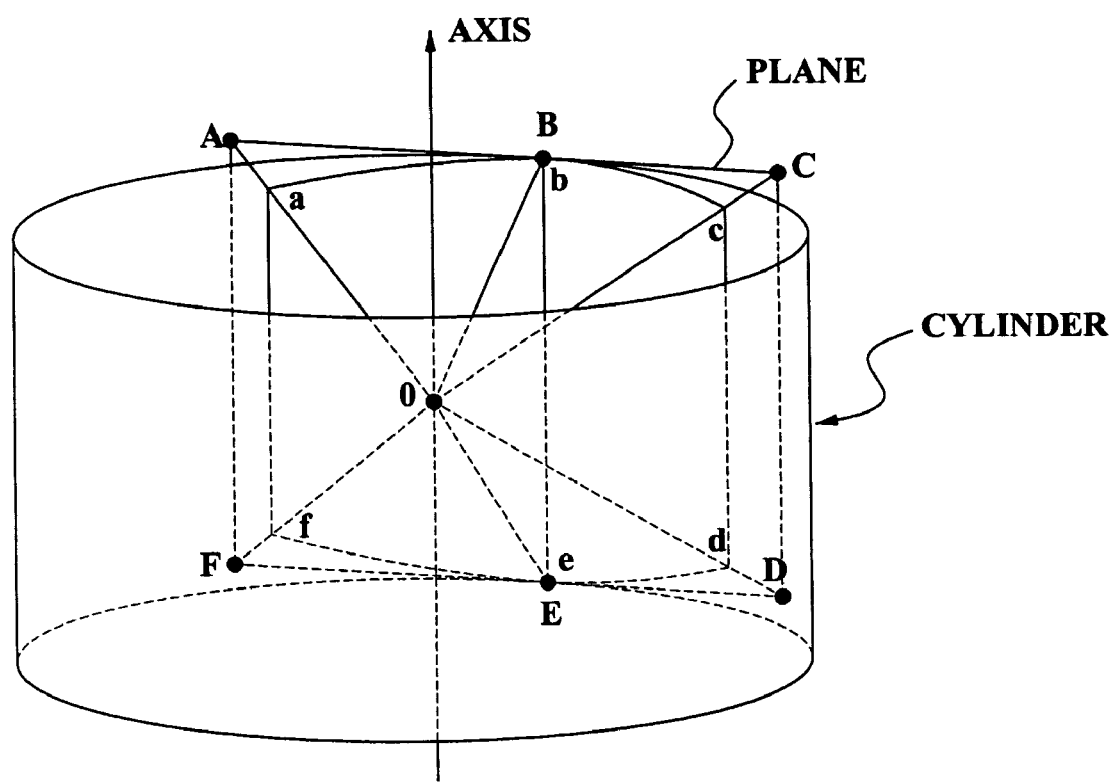
FIG. 8 illustrates a method of projecting a three-dimensional image to a cylinder.
Figure 10:
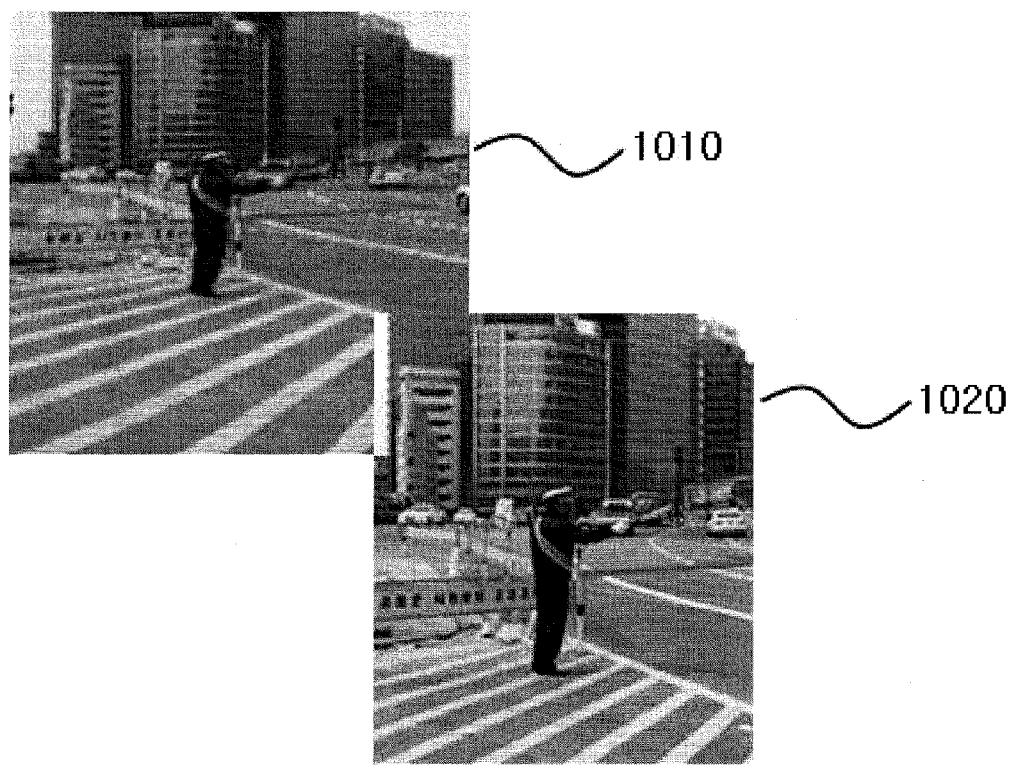
FIG. 10 illustrates photographs before and after warping correction.

Also, in operation S430, images photographed by a camera rotated on a tripod to provide a panoramic image are stitched and projected as an image in the shape of a virtual three-dimensional cylinder assumed from an optical origin 0 as shown in FIG. 7. However, general warping technologies for projection to a cylinder do not actually project images onto the cylinder. As points on the image A to F are projected as a to f in FIG. 8, edge portions are reduced toward the inside of the cylinder, thereby making an object of a photograph look either too short or too wide as shown in 1010 of FIG. 10. Though this is not a main subject of the present invention, a method of improving the problem is described in detail in another patent application and characteristics of the method will be briefly described in the current application.

Figure 9:
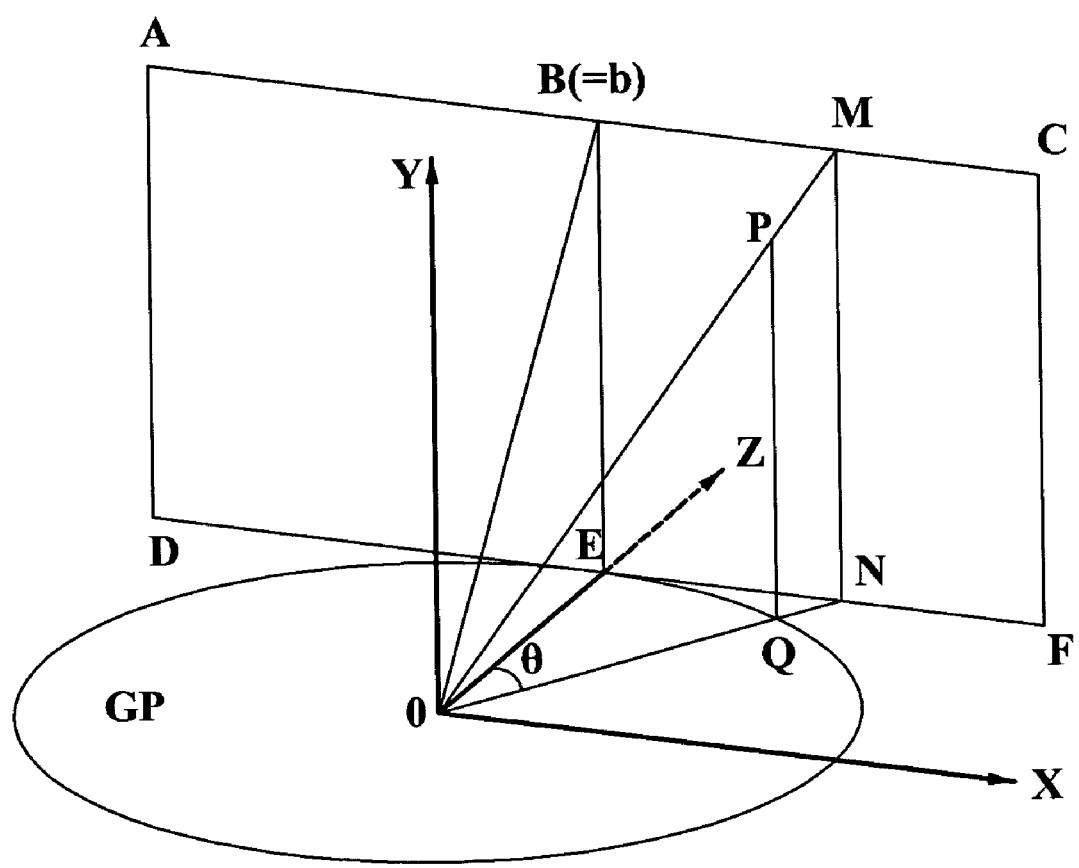
FIG. 9 illustrates a warping technology.

Namely, in FIG. 9, points of a three-dimensional object of a source image assumed to be seen from an origin 0 of a ground plane (GP) are computed to be moved to a three-dimensional vector M on a retinal plane, and a warped image width (WIW) is estimated from a size, i.e., a height and width, of the source image and a field of view (FOV). Accordingly, according to a value of an angle θ and a value of a distance between P and Q defined based on the three-dimensional vector transferred onto the retinal image plane and the WIW, a location vector of the source image may be transferred to P that is a warped location on the cylinder having unit radial distance from the origin 0 as 1 (OE=1: unit distance). In the described method, a width of a retinal image horizontally mapped on a certain value of θ according to the estimated WIW is computed to reduce the source image, thereby making a figure or a building in the photograph be normally seen without appearing to be either too short or too thick.

Figure 2:
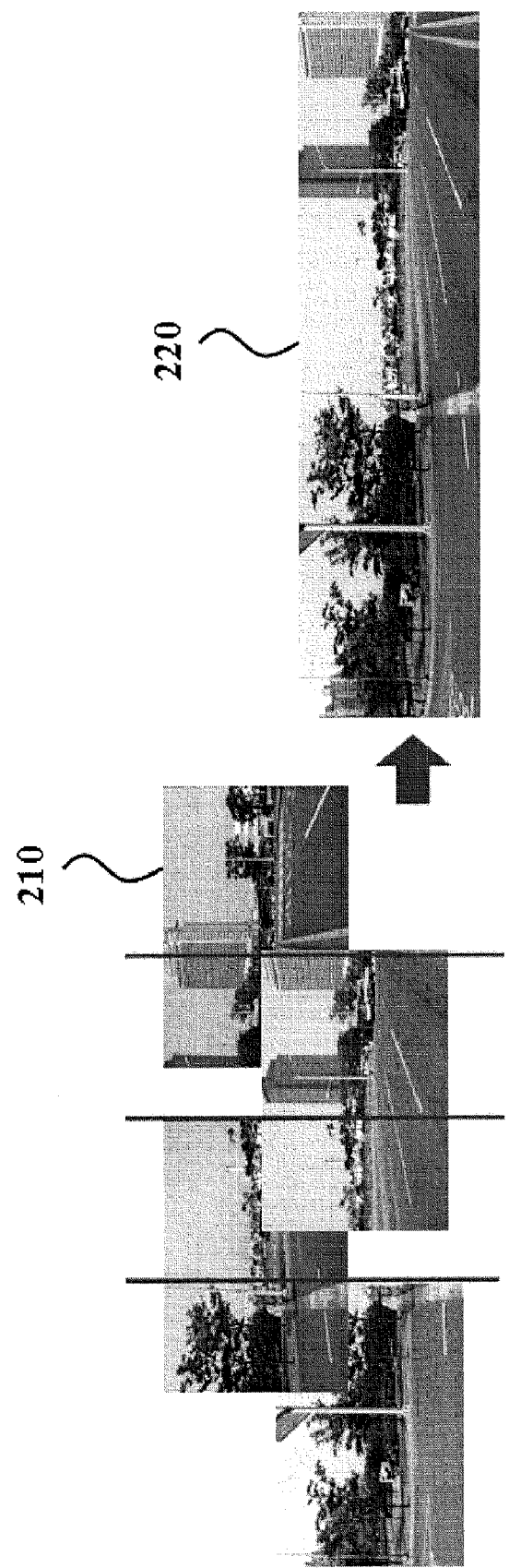
FIG. 2 illustrates a conventional image stitching technique.
Figure 11:
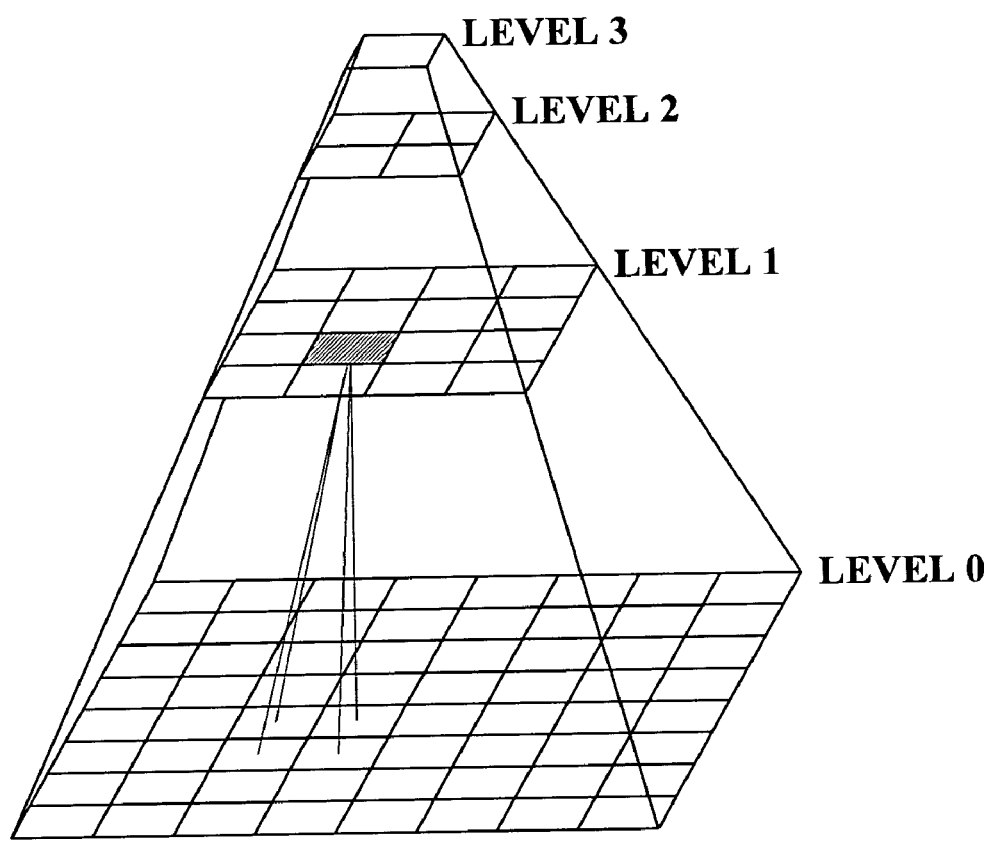
FIG. 11 illustrates a hierarchical image stitching according to an embodiment of the present invention.

FIG. 11 is a diagram illustrating hierarchical image stitching according to an embodiment of the present invention. As described above, real scenes photographed by cameras installed in several locations to provide a panoramic image are stitched on a virtual cylinder to be registered, in operation S440. In this case, as shown in 210 of FIG. 2, two images are overlapped with each other by ¼ to ¾ of a width and by 0 to ⅛ of a height to find a location that a sum of square difference (SSD) of data, as shown in Equation 1, is a minimum. Namely, in a location where an SSD between two image data is minimized, two images are stitched to each other as shown in 220 of FIG. 2, thereby completing a panoramic image. In Equation 1, $I_a(x, y)$ and $I_b(x, y)$ are data of each of two source images at coordinates (x, y) of the overlapped part.

$$SSD = \Sigma(I_a(x, y) - I_b(x, y))^2 \qquad \text{Equation 1}$$

Particularly, according to an aspect of the present invention, to reduce an amount of SSD computations, images of a plurality of levels are made by scaling each of the two source images to be stitched at several ratios, as shown in FIG. 11. For example, a source image of a level 0, having a width of 2048 pixels, is scaled to 1024 (level 1)→512 (level 2)→256 (level 3)→128 (level 4)→64 (level 5) to reduce the amount of pixel data. In this case, when the number of pixels in the width direction is reduced by ½, one pixel may be selected from four neighboring pixels.

As described above, the images of the plurality of levels are prepared, an SSD with respect to two corresponding images is computed at each of the plurality of levels and an image matched by finding a location where the SSD is a minimum may be stitched. For example, with respect to the two corresponding images of each of the levels, the SSD in an area between ¼ to ¾ of a width and 0 to ⅛ of a height in the scaled (level 5) 64 pixel width is computed to determine the location where the SSD value is a minimum, and the two images may be stitched at the determined location. The overlap area is a maximum of the range used just in the least resolution level.

In this case, the SSD value in a level with a small number of pixels from the plurality of levels is computed with enlarging a detection range, and the SSD value in a level with a successively larger number of pixels is computed with reducing the detection range, thereby gradually increasing precision while conserving overhead. For example, when a level has a number of pixels in a width less than 512, from 512 to 1024, and more than 1024, a detection range can be 6 pixels, 2 pixels, and 1 pixel, respectively. Namely, when the number of the pixels in the width is less than 512, an SSD minimum value is roughly detected and matched by moving the images for each SSD calculation in the range from −6 pixels to +6 pixels relative to each other. When the number of the pixels in the width is from 512 to 1024, the SSD minimum value is detected and matched by moving each pixel at a time in the range from −2 pixels to +2 pixels. When the number of the pixels in the width is more than 1024, the SSD minimum value is more precisely detected and matched by moving the images one single pixel at a time in the range from −1 pixel to +1 pixel.

Figure 12:
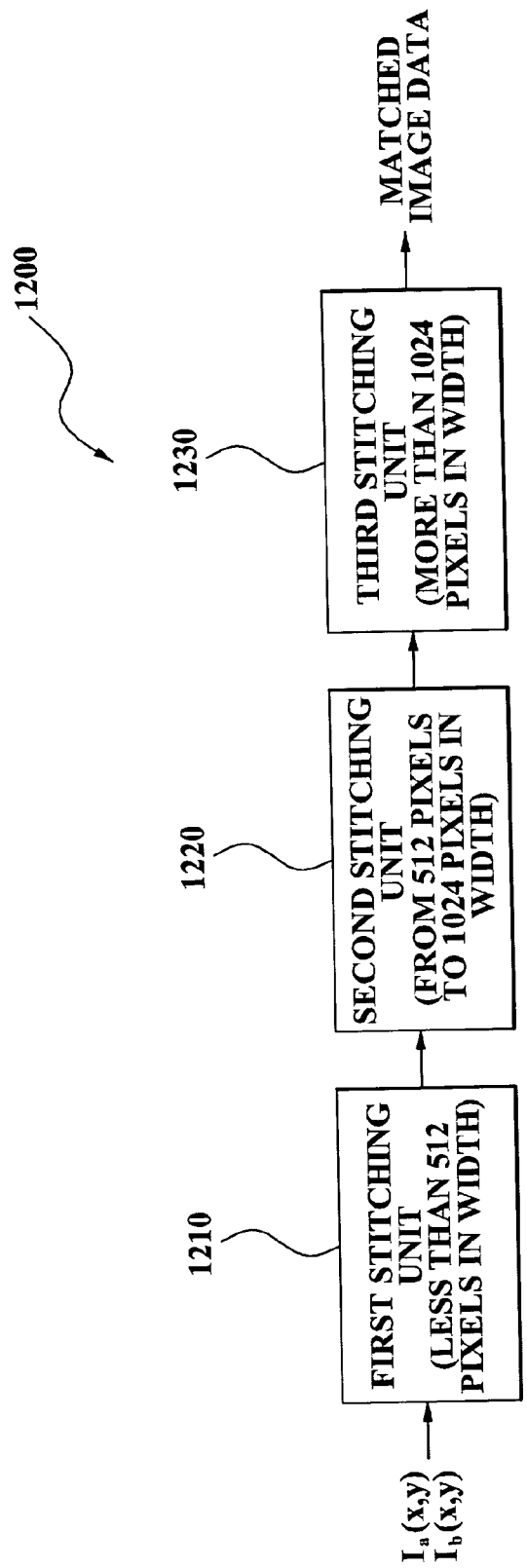
FIG. 12 is a block diagram illustrating an example of an apparatus to hierarchically image stitch according to an embodiment of the present invention.

FIG. 12 is a diagram illustrating an example of an apparatus to stitch images together according to an embodiment of the present invention. Referring to FIG. 12, an image stitching apparatus 1200 includes a first stitching unit 1210, a second stitching unit 1220, and a third stitching unit 1230.

With respect to the two source images $I_a(x, y)$ and $I_b(X, y)$ of the plurality of levels, which are scaled at several rates as shown in FIG. 11, the first stitching unit 1210, in a level in which the number of the pixels is smallest, for example, in the level of less than 512 pixels in the width, moves six pixels at a time with respect to the two images, computes an SSD, detects a location where the value of the SSD is smallest, and matches the two images.

With respect to the matched two images by the first stitching unit 1210, in a level in which the number of the pixels is larger than in the level used in the first stitching unit 1210, for example, the level in which the number of the pixels in the width is from 512 to 1024, the second stitching unit 1220 moves two pixels at a time, computes an SSD, detects a location where the value of the SSD is smallest, and matches the two images at that location. In this case, to detect a more precise location, the SSD computation may be started around the location detected by the first stitching unit 1210.

With respect to the two images matched by the second stitching unit 1220, in the level in which the number of the pixels is larger than in the level used in the second stitching unit 1220, for example, in the level where the number of the pixels in the width is more than 1024, the third stitching unit 1230 moves one image relative to the other image one pixel at a time, computes an SSD, detects a location where the value of the SSD is smallest, and matches the two images at that minimum SSD location. In this case, to detect a location more precisely than the second stitching unit 1220, the SSD computation may be started around the location detected by the second stitching unit 1220. The above stitching method can reduce the amount of computations.

Figure 3:
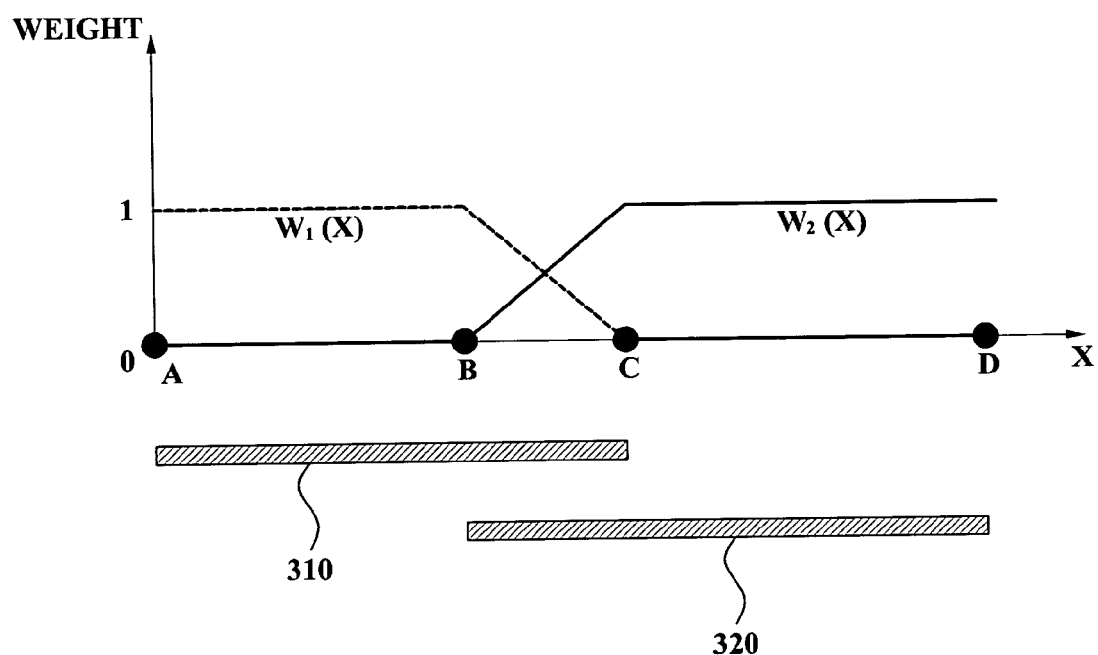
FIG. 3 illustrates a conventional color blending technology.
Figure 13:
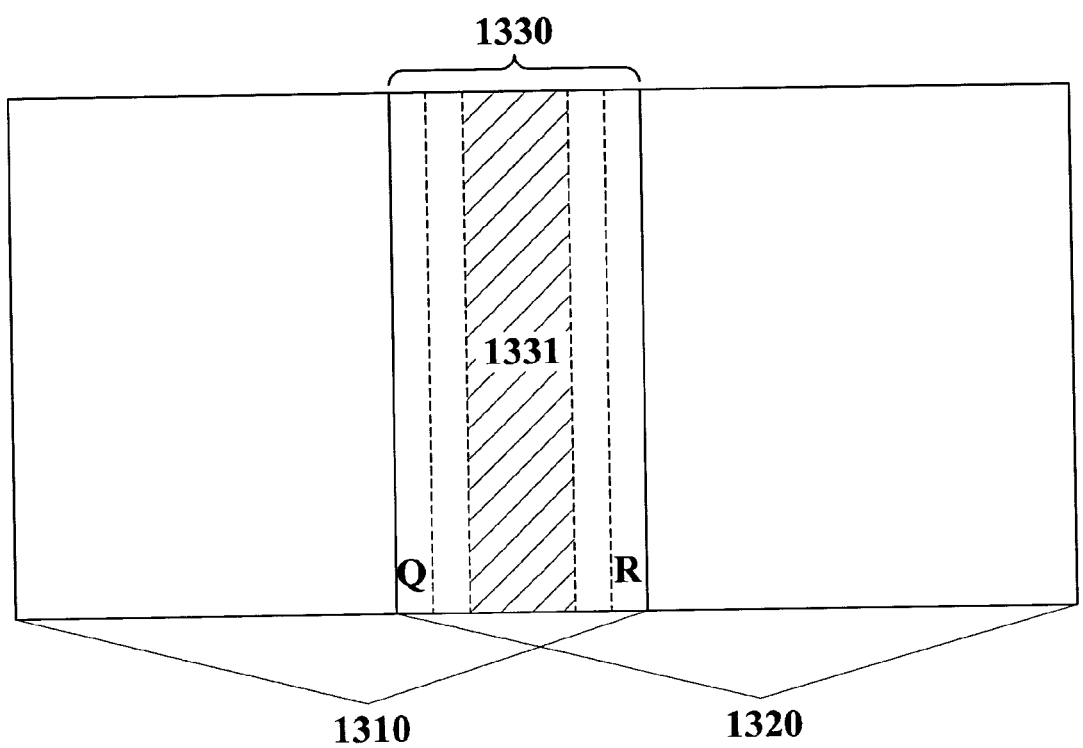
FIG. 13 illustrates a color blend area according to an embodiment of the present invention.

Image data matched as described above may be color blended by a following processor. FIG. 13 is a diagram illustrating a color blend area according to an embodiment of the present invention. When two images are stitched as described above, color information of an overlapped part of the two images may be radically different due to a difference in environments where photographs are acquired. In this case, the two images may be smoothly connected to each other by blending colors of the overlapped part, as shown in operation S450 of FIG. 4. As shown in FIG. 3, with respect to a part B to C in which two images are overlapped with each other, in a conventional method of applying linear weights to the images, the two images can not be smoothly stitched together.

According to the present embodiment, as shown in FIG. 13, a blend area 1331 that is 10% of an overlapped part 1330 of two source images 1310 and 1320 is detected within a certain range Q to R, and the same linear weights are applied to the two source images 1310 and 1320 in the blend area 1331 to generate a blend image. In this case, the certain range Q to R is a parameter for selecting a certain range of the overlapped part 1330 and may be 25 to 75%. This is just an example and another range may be selected.

Figure 15:
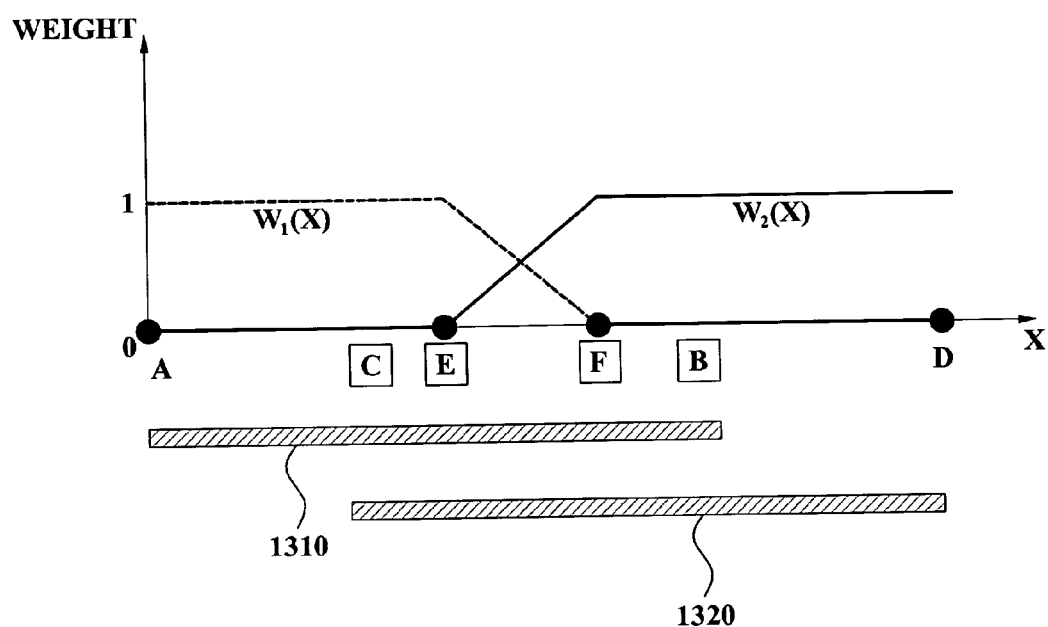
FIG. 15 illustrates a weight in the color blending according to an embodiment of the present invention.

For example, in FIG. 15, with respect to a blend area E to F that is 10% of 25 to 75% of an overlapping part of a first image 1310 having a width from A to B with a second image 1320 having a width from C to D, linear weights $W_1(X)$ and $W_2(X)$ may be applied to image data from image 1310 and image 1320 to process respectively.

Figure 16:
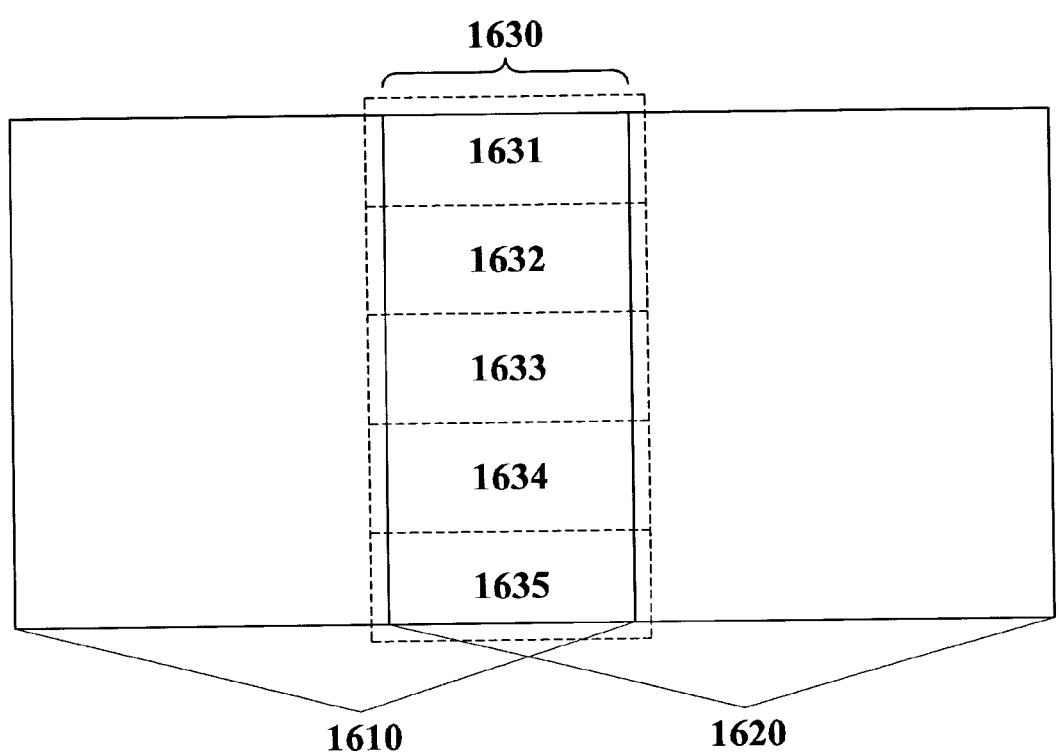
FIG. 16 illustrates a color blending according to another embodiment of the present invention.

As shown in FIG. 16, in the blend method described above, a part 1630 obtained by overlapping and stitching two source images 1610 and 1620 by 25 to 75% with each other is divided, and for each divided area, as described above, a weight may be linearly applied respectively to the two source images in a blend area that is 10% of 25 to 75% of the part 1630. According to this process, a statistical property of each area may be utilized locally with the weighting factor, thereby smoothly connecting the images for each area.

Figure 14:
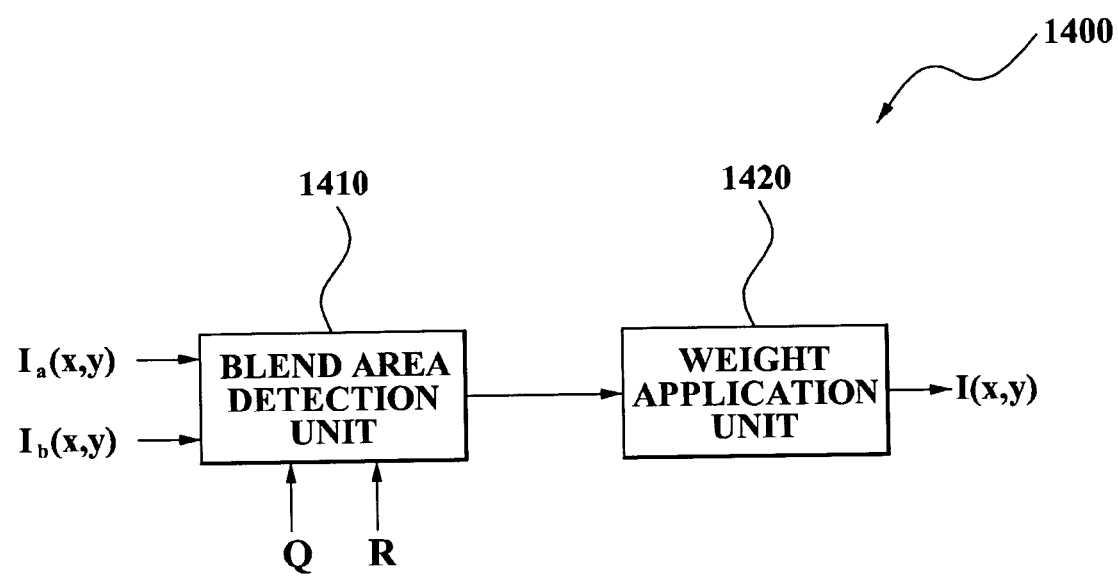
FIG. 14 is a block diagram illustrating an example of an apparatus to color blend according to an embodiment of the present invention.

FIG. 14 is a diagram illustrating an example of an apparatus to color blend according to an embodiment of the present invention. Referring to FIG. 14, a color blending apparatus 1400 includes a blend area detection unit 1410 and a weight application unit 1420.

The blend area detection unit 1410 detects 10% of a part of two overlapping stitched source images within an input range Q to R in FIG. 13 as a blend area, according to input Q and R. Accordingly, the weight application unit 1420 generates a blended image by linearly applying a weight function to the blend area E to F in the two source images in FIG. 15, namely the area 1331, as shown in FIG. 13.

The weight application unit 1420 may linearly apply the weight function to the two images in the blend area that is 10% of 25 to 75% of the part 1630 which is the overlapped part of the two source images, for each of a plurality of divided parts 1631 to 1635 as shown in FIG. 16.

Figure 17:
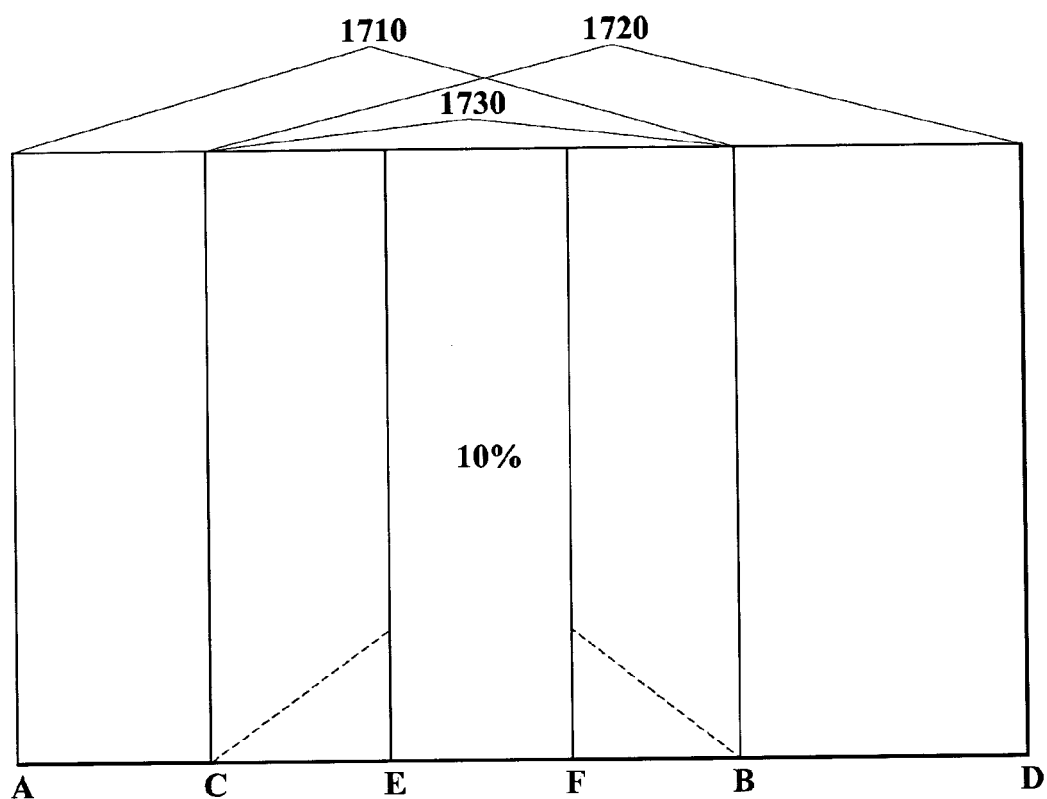
FIG. 17 illustrates a color blending according to still another embodiment of the present invention.

FIG. 17 is a diagram illustrating a color blending according to still another embodiment of the present invention. To smoothly stitch two images, a more precise method of a color blending will be described.

Referring to FIG. 17, with respect to a first relevant area E to F that is within 10% of a certain range of 25 to 75% of C to B an overlapped part of two source images 1710 and 1720, a blend image of the first relevant area is generated according to a first weight function $I_{EF}(x, y)$ linearly applied to the two source images, as shown in Equation 2. In Equation 2, $I_a(x, y)$ and $I_b(x, y)$ are data in pixel coordinates (x, y) of each of the two source images 1710 and 1720 respectively.

$$I_{EF}(x, y) = w_1(x)(K_{aE}I_a(x, y) + D_{aE}) + w_2(x)(K_{bF}I_b(x, y) + D_{bF})$$

$$K_{aE} = K_{aF} = D_{mean}/D_a$$

$$K_{bF} = K_{bE} = D_{mean}/D_b$$

$$D_{aE} = M_{mean} + M_a D_{mean}/D_a$$

$$D_{bF} = M_{mean} + M_b D_{mean}/D_b$$

$$M_{mean} = (M_a + M_b)/2$$

$$D_{mean} = (D_a + D_b)/2 \quad \text{Equation 2}$$

In Equation 2, the first weight function $I_{EF}(X, y)$ uses linear functions $w_1(x)$ and $w_2(x)$ linearly applied to two source image data $I_a(x, y)$ and $I_b(x, y)$, means $M_a$ and $M_b$ and standard deviations $D_a$ and $D_b$ of the respective source image data $I_a(x, y)$ and $I_b(x, y)$, and a total mean $M_{mean}$ and a standard deviation mean $D_{mean}$ of the combined two source image data $I_a(x, y)$ and $I_b(x, y)$. In this case, when an image is a color image, the mean may be a mean of each of red (R), green (G), and blue (B) image data. The standard deviation may be a standard deviation of each of the R, G, and B image data.

Also, as shown in FIG. 17, a blend image of a second relevant area is generated according to a second weight function $I_{CE}(X, y)$ as shown in Equation 3 applied to the first image 1710 in a left area C to E outside the area E to F that is the 10% of the certain range 25 to 75% of the part of the two overlapped source images 1710 and 1720 C to B. In Equation 3, C and E are values of an X coordinate of each pixel location. Also, $K_{ax}$ may be a linear value between $K_{aC}$ and $K_{aE}$, and $D_{ax}$ may be a linear value between $D_{aC}$ and $D_{aE}$.

$$I_{CE}(x, y) = (1 + A(x(K_{ax} - 1))I_a(x, y) + A(x)D_{ax}$$

$$A(x) = (x - C)/(E - C)$$

$$K_{aC} = 1$$

$$K_{aE} = K_{aF} = D_{mean}/D_a$$

$$D_{aC} = 0$$

$$D_{aE} = M_{mean} + M_a D_{mean}/D_a \quad \text{Equation 3}$$

In Equation 3, the second weight function $I_{CE}(x, y)$ uses the standard deviation $D_a$ of the first image data $I_a(x, y)$ of the two source image data $I_a(x, y)$ and $I_b(x, y)$, the total standard deviation $D_{mean}$ of the combined two source image data, and a linear functional standard deviation $D_{ax}$ estimated with respect to a corresponding area image, i.e., the first image to which a weight is applied, of the two source images 1710 and 1720.

Similarly, as shown in FIG. 17, a blend image is generated according to a third weight function $I_{FB}(x, y)$ as shown in Equation 4 applied to the second image 1720 in a third relevant area, a right area F to B outside the area E to F that is the 10% of the certain range 25 to 75% of the part of the two overlapped source images 1710 and 1720, area C to B. In Equation 4, B and F are values of an X coordinate of each pixel location. Also, $K_{bx}$ may be a linear value between $K_{bB}$ and $K_{bF}$, and $D_{bx}$ may be a linear value between $D_{bx}$ and $D_{bF}$.

$$I_{FB}(x, y) = (1 + A(x)(K_{bx} - 1))I_b(x, y) + A(x)D_{bx}$$

$$A(x) = (B - x)/(B - F)$$

$$K_{bB} = 1$$

$$K_{bF} = K_{bE} = D_{mean}/D_b$$

$$D_{bB} = 0$$

$$D_{bF} = M_{mean} + M_b D_{mean}/D_b \quad \text{Equation 4}$$

In Equation 4, the third weight function $I_{FB}(x, y)$ uses the standard deviation $D_b$ of the second image data $I_b(x, y)$ of the two source image data, the total standard deviation $D_{mean}$ of the two source image data, and a functional standard deviation $D_{bx}$ estimated with respect to a corresponding area image, i.e., the second image to which a weight is applied, of the two source images 1710 and 1720.

In addition, as blend image data of each of (B, y) and (C, y), as shown in Equation 5, the first image data $I_a(x, y)$ and the second image data $I_b(x, y)$ of each location are selected.

$$I(C,y)=I_a(C,y)$$

$$I(B,y)=I_b(B,y) \quad \text{Equation 5}$$

Figure 18:
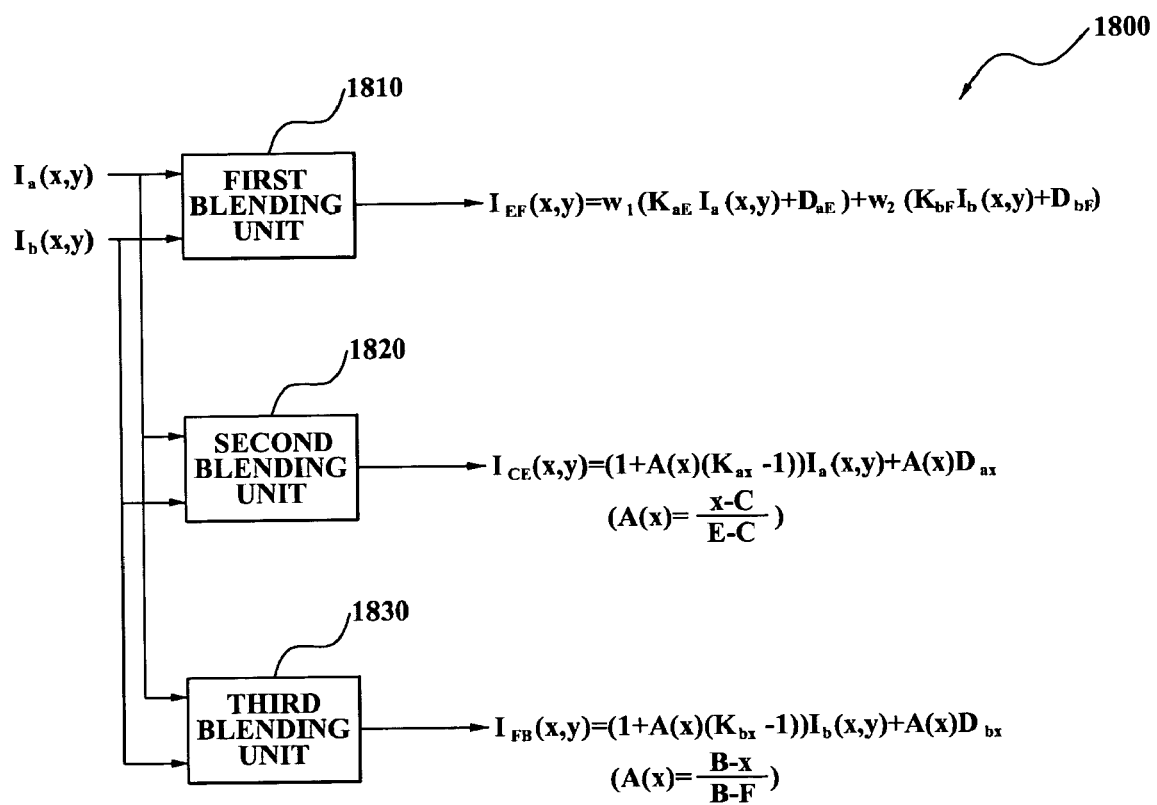
FIG. 18 is a block diagram illustrating an example of an apparatus to color blend according to the embodiment of FIG. 17.

FIG. 18 is a diagram illustrating an example of an apparatus to color blend as shown in FIG. 17. Referring to FIG. 18, a color blending apparatus 1800 includes a first blending unit 1810, a second blending unit 1820, and a third blending unit 1830.

The first blending unit 1810 generates a blend image of a first relevant area according to the first weight function $I_{EF}(x, y)$ of Equation 2, linearly applied to two images in an area E to F that is 10% of a certain range of a part of two overlapping source image data $I_a(x, y)$ and $I_b(x, y)$.

The second blending unit 1820 generates a blend image of a second relevant area according to the second weight function $I_{CE}(x, y)$ of Equation 3, applied to a left image 1710 of the two images 1710, 1720 in a left area C to E within the certain range (25-75%) of the part of the two overlapping source image data $I_a(x, y)$ and $I_b(x, y)$ but outside the 10% of the certain range E to F.

The third blending unit 1830 generates a blend image of a relevant area according to the third weight function $I_{FB}(x, y)$ of Equation 4, applied to a right image 1720 of the two images 1710, 1720 in a right area F to B within the certain range (25-75%) of the part of the two overlapping source image data $I_a(x, y)$ and $I_b(x, y)$ but outside the 10% of the certain range E to F.

Before the image stitching or the color blending, at least one of the tilting or warping as described above may be performed. Also, after the image stitching or the color blending, the resultant image may be further processed by a shear correction to render the processed image on a display.

Figure 19:
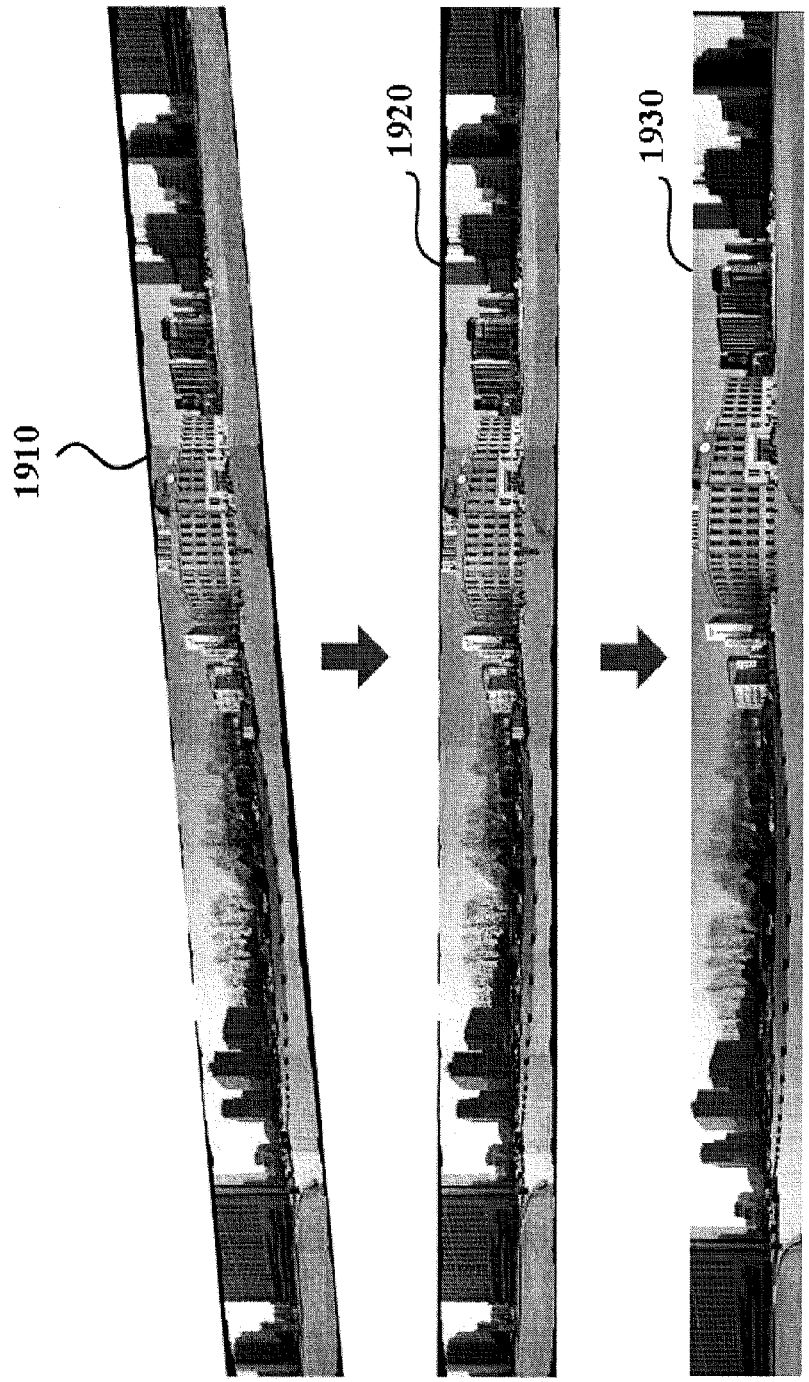
FIG. 19 illustrates a shear correction according to an embodiment of the present invention.

FIG. 19 is a diagram illustrating a shear correction according to an embodiment of the present invention.

After source images are stitched or color-blended and transferred to a cylinder as described above, a corresponding panoramic image may be connected on a slant as shown in 1910 of FIG. 19 or may have a noise image on the top and the bottom. In this case, an incline is set to connect an initial point with an endpoint when the source images are rolled in the shape of a cylinder, as shown in 1920, and a redundant part is cut from a part which extends beyond where the initial point meets the endpoint and the noise image on the top and the bottom are discarded in operation S460 of FIG. 4.

As described above, to provide a panoramic image, when a tilting correction, warping, image stitching, color blending, and a shear correction with respect to input source images are performed, processed image data may be stored in a database in a predetermined memory of a navigation system, a mobile communication device, and a PDA and may provide a clear panoramic image to a liquid crystal display (LCD) via predetermined rendering while providing a location-based service in operation S470 of FIG. 4. As described above, the proposed method of stitching or color-blending source images may be applied to provide a panoramic image as well as an image made by stitching at least two images such as satellite images of earth and astronomical images of the sky.

As described above, in the method of providing a panoramic image or at least two stitched images, according to an embodiment of the present invention, in image stitching, images of a plurality of levels made by scaling each of two source images at several rates are prepared, and an SSD with respect to a certain area of the two source images is computed to match. In this case, a detection range of a level having a small number of pixels is enlarged and the detection range of a level having a large number of pixels is reduced, thereby gradually increasing precision while conserving overhead. Also, in color blending, a weight is linearly applied to a blend area that is 10% of a certain range of a part of the two overlapping source images. In this case, the overlapping part of the two source images is divided into a plurality of portions, and a weight may be linearly applied to the blend area for each divided portion. With respect to the blend area of the certain range of the part of the two overlapping source images, a different precise weight function may be applied to an inner 10% area and side areas.

As described above, in the method and apparatus for providing a panoramic image according to an embodiment of the present invention, a processing speed of image stitching and color blending is notably improved and precise correction is performed to smoothly stitch the source images from cameras, thereby providing an image more natural and closer to reality. In this case, the proposed method of image stitching and color blending may provide a panoramic image as well as an image made by stitching at least two images. Accordingly, when the method is applied to processing of image data in a navigation system, a mobile communication device, and a PDA, thereby the device provides a location-based service with more precise and real images.

Also, the embodiments of the present invention include a computer readable medium including a program instruction for executing various operations realized by a computer. The computer readable medium may include a program instruction, a data file, and a data structure, separately or cooperatively. The program instructions and the media may be those specially designed and constructed for the purposes of the present invention, or they may be of the kind well known and available to those skilled in the art of computer software arts. Examples of the computer readable media include magnetic media (e.g., hard disks, floppy disks, and magnetic tapes), optical media (e.g., CD-ROMs or DVD), magneto-optical media (e.g., floptical disks), and hardware devices (e.g., ROMs, RAMs, or flash memories, etc.) that are specially configured to store and perform program instructions. The media may also be transmission media such as optical or metallic lines, wave guides, etc. including a carrier wave transmitting signals specifying the program instructions, data structures, etc. Examples of the program instructions include both machine code, such as produced by a compiler, and files containing high-level languages codes that may be executed by the computer using an interpreter. The hardware elements above may be configured to act as one or more software modules for implementing the operations of this invention.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of providing a panoramic image, the method comprising:

preparing images of a plurality of levels, which are made by scaling each of two source images at several rates; and computing a Sum of Square Difference (SSD) with respect to two corresponding images at each respective level of the plurality of levels of the two source images to form a stitched together image, wherein each respective level of the plurality of levels has a different pixel width from other levels.

2. The method of claim 1, wherein:

the SSD with respect to a level having a first number of pixels of the plurality of levels is computed in a first image search range, and the SSD with respect to a level having a second larger number of pixels of the plurality of levels is computed in a second smaller image search range, so as to increase matching precision.

3. The method of claim 1, wherein the forming of the stitched together image comprises:

computing the SSD with respect to a certain area of the two corresponding images in a level having a first number of pixels of the images of a plurality of levels and detecting a position having the smallest SSD value, so as to first match the two source images; and computing the SSD with respect to the certain area of the two corresponding images in a level having a second larger number of pixels than the level used in the first matching of the images of the plurality of levels and detecting a position having the smallest SSD value, so as to again match the first matched two images.

4. The method of claim 1, further comprising:

tilting or warping an image before the forming of the stitched together image; and shear correcting after the forming of the stitched together image, so as to be used in image rendering.

5. A non-transitory computer readable recording medium in which a program for executing the method of claim 1 is recorded.

6. The method of claim 1, further comprising:

matching an image by finding a location in each respective level of the plurality of levels where the computed SSD is a minimum.

7. A stitching apparatus for a panoramic image, the apparatus comprising:

a first stitching unit to compute an SSD between two corresponding images in a level having a first number of pixels in a plurality of levels which are made by scaling each of the two source images at several rates and detecting a position having the smallest SSD value to match the two source images; and a second stitching unit to compute the SSD between two corresponding images in a level of the images having a second number of pixels larger than in the first stitching unit so as to again match the two source images matched by the first stitching unit, wherein each level of the plurality of levels has a different pixel width from other levels.

8. The apparatus of claim 7, wherein an image search range for computing the SSD in the first stitching unit is larger than an image search range for computing the SSD in the second stitching unit.

* * * * *

UNITED STATES PATENT AND TRADEMARK OFFICE
CERTIFICATE OF CORRECTION

| | | |
|---|---|---|
| PATENT NO. | : 8,189,031 B2 | Page 1 of 1 |
| APPLICATION NO. | : 11/591461 | |
| DATED | : May 29, 2012 | |
| INVENTOR(S) | : Keun Ho Kim et al. | |

It is certified that error appears in the above-identified patent and that said Letters Patent is hereby corrected as shown below:

Column 1, Line 10, Delete "2006-2710," and insert -- 2006-2170, --, therefor.

Signed and Sealed this
Fourteenth Day of August, 2012

David J. Kappos
*Director of the United States Patent and Trademark Office*